United States Patent
Vesel et al.

(10) Patent No.: US 7,116,266 B1
(45) Date of Patent: Oct. 3, 2006

(54) TRAFFIC ALERT AND COLLISION AVOIDANCE SYSTEM ENHANCED SURVEILLANCE SYSTEM AND METHOD

(75) Inventors: Andrew M. Vesel, Indialantic, FL (US); Robert H. Saffell, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 110 days.

(21) Appl. No.: 10/869,275

(22) Filed: Jun. 16, 2004

(51) Int. Cl.
  *G01S 13/93* (2006.01)
  *G01S 13/74* (2006.01)
  *G01S 7/40* (2006.01)
  G01S 5/14 (2006.01)
  H04B 7/185 (2006.01)

(52) U.S. Cl. .......................... 342/30; 342/29; 342/36; 342/42; 342/46; 342/165; 342/173; 342/357.01; 342/357.06; 701/200; 701/207; 701/213; 701/300; 701/301

(58) Field of Classification Search ............ 342/29–51, 342/450–465, 357.01–357.17, 165–175, 342/195; 701/300, 301, 200, 207–223
See application file for complete search history.

(56) References Cited

U.S. PATENT DOCUMENTS

| | | | |
|---|---|---|---|
| 4,710,774 A | 12/1987 | Gunny | 342/455 |
| 4,782,450 A | 11/1988 | Flax | |
| 5,280,285 A | 1/1994 | Curtis et al. | 342/32 |
| 5,570,095 A | 10/1996 | Drouilhet, Jr. et al. | |
| 5,636,123 A * | 6/1997 | Rich et al. | 701/300 |
| 5,867,804 A | 2/1999 | Pilley et al. | 701/120 |
| 5,933,099 A | 8/1999 | Mahon | |
| 6,182,005 B1 | 1/2001 | Pilley et al. | 701/120 |
| 6,262,679 B1 * | 7/2001 | Tran | 342/29 |
| 6,271,768 B1 * | 8/2001 | Frazier et al. | 342/29 |
| 6,275,172 B1 * | 8/2001 | Curtis et al. | 342/29 |
| 6,278,396 B1 * | 8/2001 | Tran | 342/29 |
| 6,380,869 B1 | 4/2002 | Simon et al. | |
| 6,433,729 B1 | 8/2002 | Staggs | 342/29 |
| 6,459,411 B1 | 10/2002 | Frazier et al. | 342/455 |
| 6,531,978 B1 * | 3/2003 | Tran | 342/29 |
| 6,546,338 B1 | 4/2003 | Sainthuile et al. | 701/301 |
| 6,552,669 B1 | 4/2003 | Simon et al. | |
| 6,563,453 B1 * | 5/2003 | Wilson | 342/29 |
| 6,646,588 B1 * | 11/2003 | Tran | 342/29 |
| 6,657,578 B1 * | 12/2003 | Stayton et al. | 342/30 |
| 6,683,541 B1 | 1/2004 | Staggs et al. | |
| 6,683,562 B1 | 1/2004 | Stayton et al. | 342/182 |
| 6,816,105 B1 * | 11/2004 | Winner et al. | 342/37 |

OTHER PUBLICATIONS

H. Heinlin, "TCAS"; posted on the Internet at www.aerowinx.de; copyrighted 1995-2002.*
"Traffic Alert/Collision Avoidance System"; no author listed; posted on the Internet at www.allstar.fiu.edu; last updated Mar. 12, 2004; copyrighted 1995-2005.*

* cited by examiner

*Primary Examiner*—Bernarr E. Gregory
(74) *Attorney, Agent, or Firm*—Nathan O. Jensen; Kyle Eppele

(57) ABSTRACT

A traffic alert and collision and avoidance system (TCAS) is disclosed. The TCAS comprises a first transponder and a first interrogator associated with a first aircraft. The first transponder sends an interrogation request. The TCAS also comprises a second transponder associated with a second aircraft. The second transponder responds to the interrogation request. The response comprises enhanced surveillance data that was asked for in the request.

20 Claims, 5 Drawing Sheets

TRAFFIC ALERT AND COLLISION AVOIDANCE SYSTEM ENHANCED SURVEILLANCE SYSTEM AND METHOD

BACKGROUND

Conventionally, avionics, engineers and certification bodies are improving and providing pilots and flight crews with information necessary to identify in-flight traffic. An approach has been to provide the flight crew with information on the location of other aircraft in the area. One exemplary system which is capable of providing this information, is known as a traffic alert and collision avoidance system (TCAS). The systems are required for all airliners flying the United States air space today. TCAS devices have been designed to interrogate transponders of other aircrafts, sometimes referred to as intruder aircraft. The TCAS system evaluates the threat of collision with other aircraft and coordinates an avoidance maneuver for the aircraft.

Recently, the aviation industry has worked to define a new standard of performance for Mode S transponders which are the communication devices used in most TCAS systems. The extension of the function of Mode S transponders is to provide more information about the state and plans of aircraft which are under surveillance. This extended information may collectively be called "enhanced surveillance". The feature is designed to provide ground-based aircraft control and additional information to enable improved management of air traffic. Although this information is provided from Mode S transponders to ground-based air traffic control, it may be desirable and useful for a first aircraft to be able to interrogate a Mode S transponder and receive enhanced surveillance information from a Mode S transponder on a second aircraft.

Accordingly, there is a need for a system and method in which the first aircraft may request and receive enhanced surveillance information from other airborne Mode S transponders. Further, there is a need for a system and method in which the first aircraft may request and receive enhanced surveillance information from a second aircraft Mode S transponder and provide integrity checking of the position of the aircraft. Further still, there is a need for a airborne system onboard a first aircraft which may interrogate a second aircraft's Mode S transponder at a variable rate, the rate dependent upon the determined dynamics of particular requested data.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a traffic alert and collision and avoidance system (TCAS). The TCAS comprises a first interrogator associated with a first aircraft, the first transponder sending an interrogation request. The TCAS system also comprises a second transponder associated with a second aircraft, the second transponder responding to the interrogation request. The response comprises enhanced surveillance data that was asked for in the request.

What is also provided is a method of providing air traffic information from a first aircraft to a second aircraft. The method comprises receiving an interrogation request from a first aircraft. The request includes a request for enhanced surveillance data. The method also comprises responding by a second aircraft transponder a message comprising enhanced surveillance data that was asked for in the request.

Further, what is provided is a method of integrity checking the position of a second aircraft. The method comprises interrogating an aircraft transponder including a request for enhanced surveillance data including the position of the second aircraft. The method also comprises receiving a reply to the interrogation request by the first aircraft. Further, the method comprises calculating the position of the second aircraft based on the message response time and its bearing. Further still the method comprises comparing the calculated position with the received position. Yet further still, the method comprises determining the integrity of the received position.

Further still, what is provided is a method of interrogating the traffic alert and collision avoidance system transponder. The method comprises interrogating an aircraft transponder including a request for enhanced surveillance data. The method also comprises determining based on the enhanced surveillance data received, whether the rate of interrogation should be changed. Further, the method comprises changing the rate of interrogation if it is determined that the rate should be changed.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
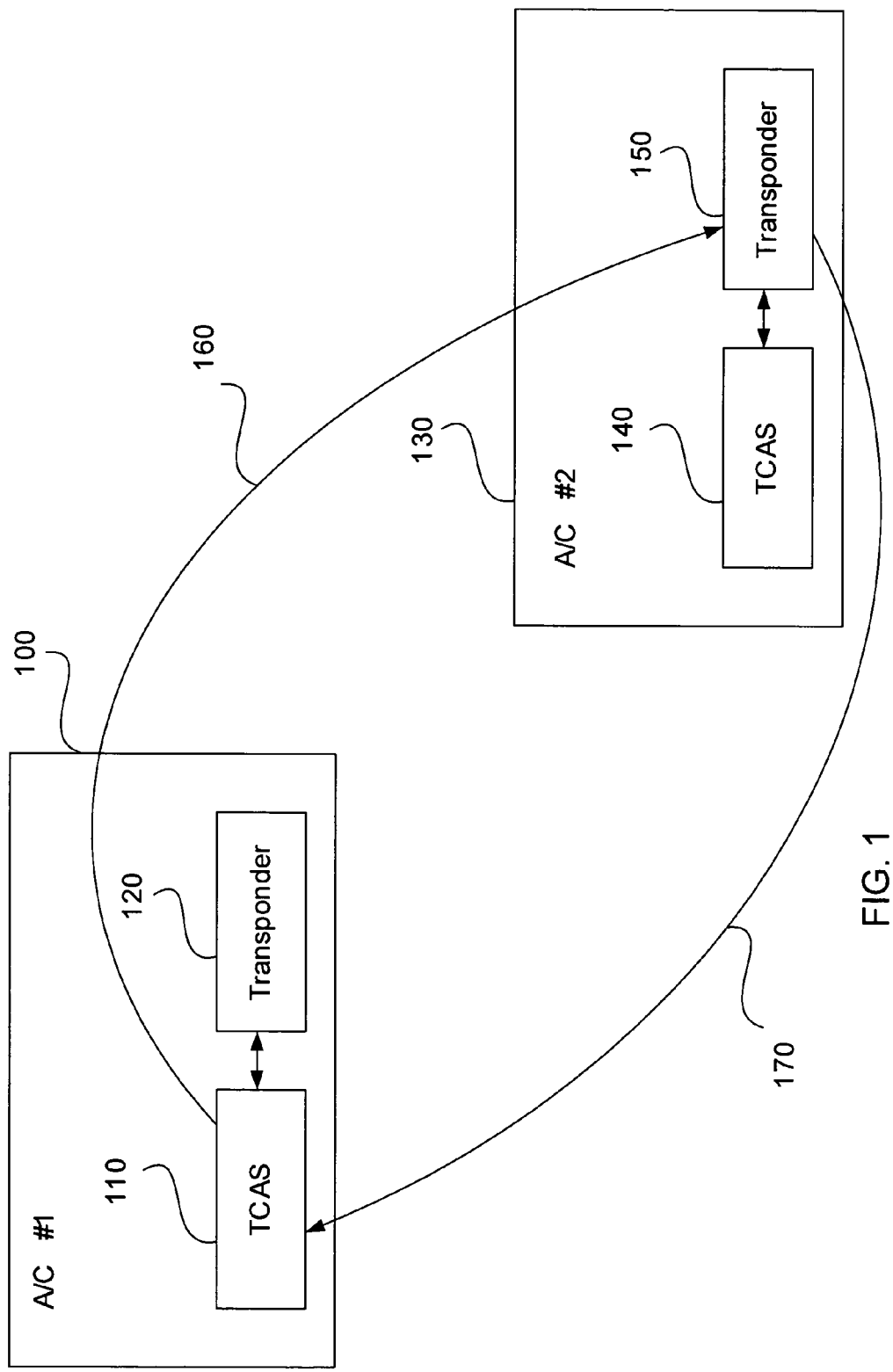
FIG. 1 is an exemplary block diagram of two aircraft, each having transponders and one aircraft providing enhanced surveillance data to the other aircraft in response to a request.

Before describing in detail the particular improved system and method, it should be observed that the invention includes, but is not limited to a novel structural combination of conventional data/signal processing elements and communication circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with the structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a first aircraft 100 is depicted. First aircraft 100 may be any of a variety of aircrafts including but not limited to airplanes and helicopters. Aircraft 100 may have an onboard TCAS system 110 which may include a transponder 120 and an interrogator. As depicted in FIG. 1, the interrogator may be a part of TCAS block 110 or may alternatively be a separate interrogator unit. Transponder 120 may be a Mode S transponder or other type of applicable transponder. Similarly, a second aircraft 130 is in the vicinity of aircraft 100. Aircraft 130 also has a TCAS system 150 including a transponder 140 which may be a Mode S or other transponder. In operation, as aircraft 130 comes into the local vicinity of aircraft 100, aircraft 100 transmits an interrogation signal 160 to aircraft 130. Transponder 140 interprets the interrogation signal and provides the requested information over the air to aircraft 100. In an exemplary embodiment, the requested information includes enhanced surveillance information, that is information which is beyond the typical position and identification information used in conventional TCAS systems.

Table 1 is an exemplary embodiment of the registers identified in a Mode S transponder and the register parameter contents that may be extracted from the transponder by an interrogator according to the ground-initiated COMM-B protocol (GICB). The information shown corresponds with enhanced surveillance data.

TABLE 1

Register Allocation and Parameters as per ICAO Annex 10, Volume III, Chapter 5, Appendix.

| GICB (BDS) Register # | Register Name | Register Parameter Contents |
|---|---|---|
| 0.5 | Extended Squitter Airborne Position | Format Type Code<br>Surveillance Status<br>Single Antenna Flag Bit<br>Altitude<br>Time Tag Bit<br>Compact Position Reporting Format Bit<br>Encoded Latitude<br>Encoded Longitude |
| 0.6 | Extended Squitter Surface Position | Format Type Code<br>Movement<br>Ground Track Status Bit<br>Ground Track (True)<br>Time Tag Bit<br>Compact Position Reporting Format Bit<br>Encoded Latitude<br>Encoded Longitude |
| 0.7 | Extended Squitter Status | Transmission Rate Subfield (TRS)<br>Altitude Type Subfield (ATS) |
| 0.8 | Extended Squitter Aircraft Identification and Category | Format Type Code<br>Aircraft Category<br>Aircraft Identification Character 1 through 8 |
| 0.9 | Extended Squitter Airborne Velocity - Subtype 1 and 2 (Velocity over Ground) | Format Type Code<br>Subtype<br>Intent Change Flag Bit<br>IFR Capability Flag Bit<br>Navigation Uncertainty Category - Velocity<br>East/West Velocity<br>North/South Velocity<br>Vertical Rate<br>GNSS Altitude Difference from Barometric Alt. |

TABLE 1-continued

Register Allocation and Parameters as per ICAO Annex 10, Volume III, Chapter 5, Appendix.

| GICB (BDS) Register # | Register Name | Register Parameter Contents |
|---|---|---|
| 0.9 | Extended Squitter Airborne Velocity - Subtype 3 and 4 (Airspeed and Heading) | Format Type Code<br>Subtype<br>Intent Change Flag Bit<br>IFR Capability Flag Bit<br>Navigation Uncertainty Category - Velocity<br>Magnetic Heading<br>Airspeed (True or Indicated)<br>Vertical Rate<br>GNSS Altitude Difference from Barometric Alt. |
| 0.A | Extended Squitter Event Driven Messages | Used to multiplex transmission of messages contained in registers 6.1–through- 6.f |
| 0.B | Aircraft State Information 1 (Aircraft State) | True Airspeed<br>Heading<br>True Track Angle<br>Ground Speed |
| 0.C | Aircraft State Information 2 (Aircraft Intent) | Level Off Altitude<br>Next Course (True Ground Track)<br>Time to Next Waypoint<br>Vertical Velocity<br>Roll Angle |
| 0.D–0.E | Reserved for Air/Air State Information | |
| 0.F | Reserved for ACAS | |
| 1.0 | Data Link Capability Report | Various Datalink and TCAS Capability Annunciations |
| 1.7 | Common Usage GICB Capability Report | Used to declare common usage GICB register services currently being supported |
| 1.8–through- 1.C | Mode-S Specific Services GICB Capability Reports | Used to declare GICB services that are installed |
| 1.D–through- 1.F | Mode-S Specific Services MSP Capability Reports | Used to indicate Modes S Specific Protocol services that are installed and require servicing. |
| 2.0 | Aircraft Identification | Aircraft Identification Character 1–through- 8 |
| 2.1 | Aircraft and Airline Registration | Aircraft Registration Number, Character 1–through- 7<br>ICAO Airline Registration Marking, Character 1 and 2 |
| 2.2 | Antenna Positions | Antenna 1 Position<br>Antenna 2 Position<br>Antenna 3 Position<br>Antenna 4 Position |
| 2.5 | Aircraft Type | Aircraft Type<br>Number of Engines<br>Engine Type<br>Model Designation, Character 1–through- 5<br>Wake Turbulence Category |
| 3.0 | ACAS Active Resolution Advisory | Active Resolution Advisories<br>Resolution Advisory Complement Record<br>Resolution Advisory Terminated Bit<br>Multiple Threat Encounter Bit<br>Threat-Type Indicator<br>Threat Identity Data |

TABLE 1-continued

Register Allocation and Parameters as per ICAO Annex 10, Volume III, Chapter 5, Appendix.

| GICB (BDS) Register # | Register Name | Register Parameter Contents |
|---|---|---|
| 4.0 | Selected Vertical Intention | MCP/FCU Selected Altitude<br>FMS Selected Altitude<br>Barometric Pressure Setting - minus 800 mb<br>Status of MCP/FCU Mode Bits<br>VNAV Mode Bit<br>Altitude Hold Bit<br>Approach Mode Bit<br>Status of Target Altitude Source Bits<br>Target Altitude Source Bits (2) |
| 4.1 | Next Waypoint Details - Identity | Characters 1–through- 9 |
| 4.2 | Next Waypoint Details - Position | Waypoint Latitude<br>Waypoint Longitude<br>Waypoint Crossing Altitude |
| 4.3 | Next Waypoint Details - Nav | Bearing to Waypoint<br>Time-to-Go<br>Distance-to-Go |
| 4.4 | Meteorological Routine Air Report | FOM/Source<br>Wind Speed<br>Wind Direction (True)<br>Static Air Temperature<br>Average Static Pressure<br>Turbulence<br>Humidity |
| 4.5 | Meteorological Hazard Report | Turbulence<br>Wind Shear<br>Microburst<br>Icing<br>Wake Vortex<br>Static Air Temperature<br>Average Static Pressure<br>Radio Height |
| 4.6 | Reserved for Flight Management System Mode 1 | |
| 4.7 | Reserved for Flight Management System Mode 2 | |
| 4.8 | VHF Channel Report | VHF 1<br>VHF 1 Audio Status<br>VHF 2<br>VHF Audio Status<br>VHF 3<br>VHF 3 Audio Status |
| 5.0 | Track and Turn Report | Roll Angle<br>True Track Angle<br>Ground Speed<br>Track Angle Rate<br>True Airspeed |
| 5.1 | Position Report - Course | Latitude - Coarse<br>Longitude - Coarse<br>Pressure Altitude |
| 5.2 | Position Report - Fine | Latitude - Fine<br>Longitude - Fine<br>Pressure Altitude or GNSS Height (HAE) |
| 5.3 | Air Referenced State Vector | Magnetic Heading<br>Indicated Airspeed (IAS)<br>Mach Number<br>True Airspeed (TAS)<br>Altitude Rate |
| 5.4 | Waypoint 1 Information | Status<br>Waypoint Identifier, Character 1–through- 5<br>Estimated Time of Arrival (Normal Flight)<br>Estimated Flight Level (Normal Flight)<br>Time-to-Go (Direct Route) |
| 5.5 | Waypoint 2 Information | Status<br>Waypoint Identifier, Character 1–through- 5<br>Estimated Time of Arrival (Normal Flight)<br>Estimated Flight Level (Normal Flight)<br>Time-to-Go (Direct Route) |
| 5.6 | Waypoint 3 Information | Status<br>Waypoint Identifier, Character 1–through- 5<br>Estimated Time of Arrival (Normal Flight)<br>Estimated Flight Level (Normal Flight)<br>Time-to-Go (Direct Route) |
| 5.F | Quasi-Static Parameter Monitoring | Selected Altitude Monitor__2 bits<br>Selected Heading Monitor__2 bits<br>Selected Mach Number Monitor__2 bits<br>Selected Altitude Rate Monitor__2 bits<br>Next Waypoint Monitor__2 bits<br>FMS Horizontal Mode Monitor__2 bits<br>VHF Channel Report Monitor__2 bits<br>Meteorological Hazards Monitor__2 bits<br>Target Altitude Monitor__2 bits |
| 6.0 | Heading and Speed Report | Magnetic Heading<br>Indicated Airspeed<br>Mach<br>Barometric Altitude Rate<br>Inertial Vertical Velocity |
| 6.1 | Emergency/Priority Status | Format Type Code = 28<br>Subtype Code = 1<br>Emergency/Priority Status |
| 6.2 | Reserved for Trajectory Change Point | |
| 6.3 | Reserved for Trajectory Change Point | |
| 6.4 | Reserved for Aircraft Operational Coordination message | |
| 6.5 | Reserved for Aircraft Operational Status | |
| 6.6–6.F | Reserved for Extended Squitter | |
| 7.0–7.5 | Reserved for Future Aircraft Downlink Parameters | |
| E.1–E.2 | Reserved for Mode-S Byte | |
| F.1 | Reserved for Military Applications | |
| F.2 | Reserved for Military Applications | |

Figure 2:
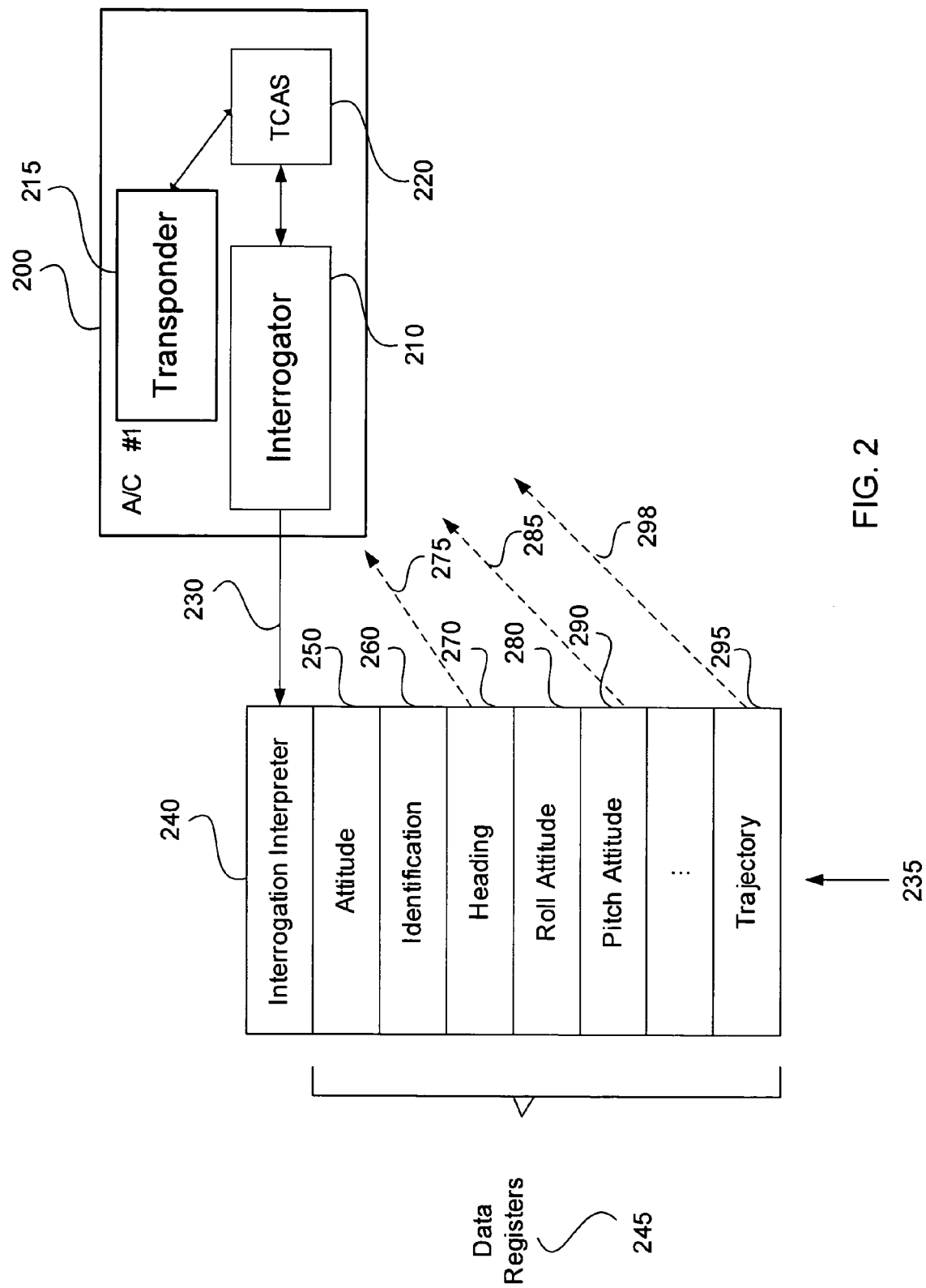
FIG. 2 is an exemplary embodiment of the data registers for a second aircraft transponder in which enhanced surveillance data is available.

Referring to FIG. 2, aircraft 200 which includes TCAS system 220, including a transponder 215 and an interrogator 210 sends an interrogation signal 230 to a transponder 235 which has an interrogation interpreter and a plurality of data registers 245 including, but not limited to registers having altitude information 250, identification information 260, heading information 270, roll attitude information 280, pitch attitude information 290, and trajectory information 295. Registers 235 are simply illustrative and are not limited by the types of information depicted. As interrogation interpreter receives the interrogation signal 230, interrogation interpreter 240 determines what data registers should be reported in a reply to aircraft 200's request. For example, in the figure, heading information 270 is reported via a communication 275. Pitch attitude 290 is reported in a communication 285, and trajectory information is communicated in a communication 298 back to interrogator transponder 210. Accordingly, the benefits of enhanced surveillance to airborne interrogators is extended. Currently, only ground-based air traffic control interrogators may utilize this capability. An airborne interrogator makes the benefits of enhanced surveillance available to aircraft. In one exemplary embodiment, the airborne interrogator may be a TCAS. In current applications, TCAS simply interrogates the transponder of another intruder aircraft to obtain its range and altitude. Given the small amount of information, the TCAS system decides if the intruder is a collision threat. Utilizing enhanced surveillance information, a TCAS can make interrogation of the intruder's transponder. This provides TCAS with significantly more information (enhanced surveillance data) than range and altitude. This includes items like intruder's aircraft's heading, pitch and roll angles, the aircraft's velocities and position, and many other items including intended flight path trajectories (see Table 1).

As an example, an operational enhancement that may occur using enhanced surveillance data is an opportunity to avoid collisions and/or reduce the number of false alarms by utilizing information of the intended trajectory of a second aircraft. In past applications of TCAS, the inability to obtain the intended trajectory information has been a significant limitation to TCAS applications.

TCAS must provide decisions to avoid collisions with enough warning to allow the pilot of the aircraft to react. The period is typically 30 to 45 seconds. Without intent information, TCAS may only be used to project the trajectory of the intruder based on the past behavior of that aircraft. If the intruder does not intend to continue "doing what it's been doing", this projection may be in error. This may result in unnecessary alarms or alarms that come without comfortable warning. In the case that enhanced surveillance information is available to the aircraft and the intended trajectory is known, alarms can be deferred without the potential for a collision. One such situation, for example, is called a "bump up." This occurs when a first aircraft is level at a given altitude and an intruder aircraft is climbing to level off at an altitude 1,000 feet below the first aircraft. In today's TCAS systems, TCAS does not know that the intruder intends to level off and issues an alarm, advising the pilot of the first aircraft to climb to avoid the intruder. However, the alarm, in this case, is unnecessary and could be avoided if TCAS had known that the intruder was going to level off.

The implementation of the system utilizes existing hardware on aircraft. TCAS interrogates Mode S transponders for the purpose of obtaining range and altitude. Enhanced surveillance transponders have the capability to respond to an interrogation requesting the enhanced information discussed above. The Mode S transponder responds with the enhanced surveillance information requested by an interrogator by processing the content of the interrogation. TCAS needs only to change the data content of its existing interrogation to request the data information in this way. Only minor changes to the content of the TCAS interrogation and no changes to the enhanced surveillance Mode S transponder are necessary to make the new information available for use by TCAS. The airborne interrogator may use the ground-initiated comm-B protocol (GICB) to extract the information from other aircraft. The protocol has already been standardized internationally in the Mode S minimum operational performance standard (ICAO annex 10).

Figure 3:
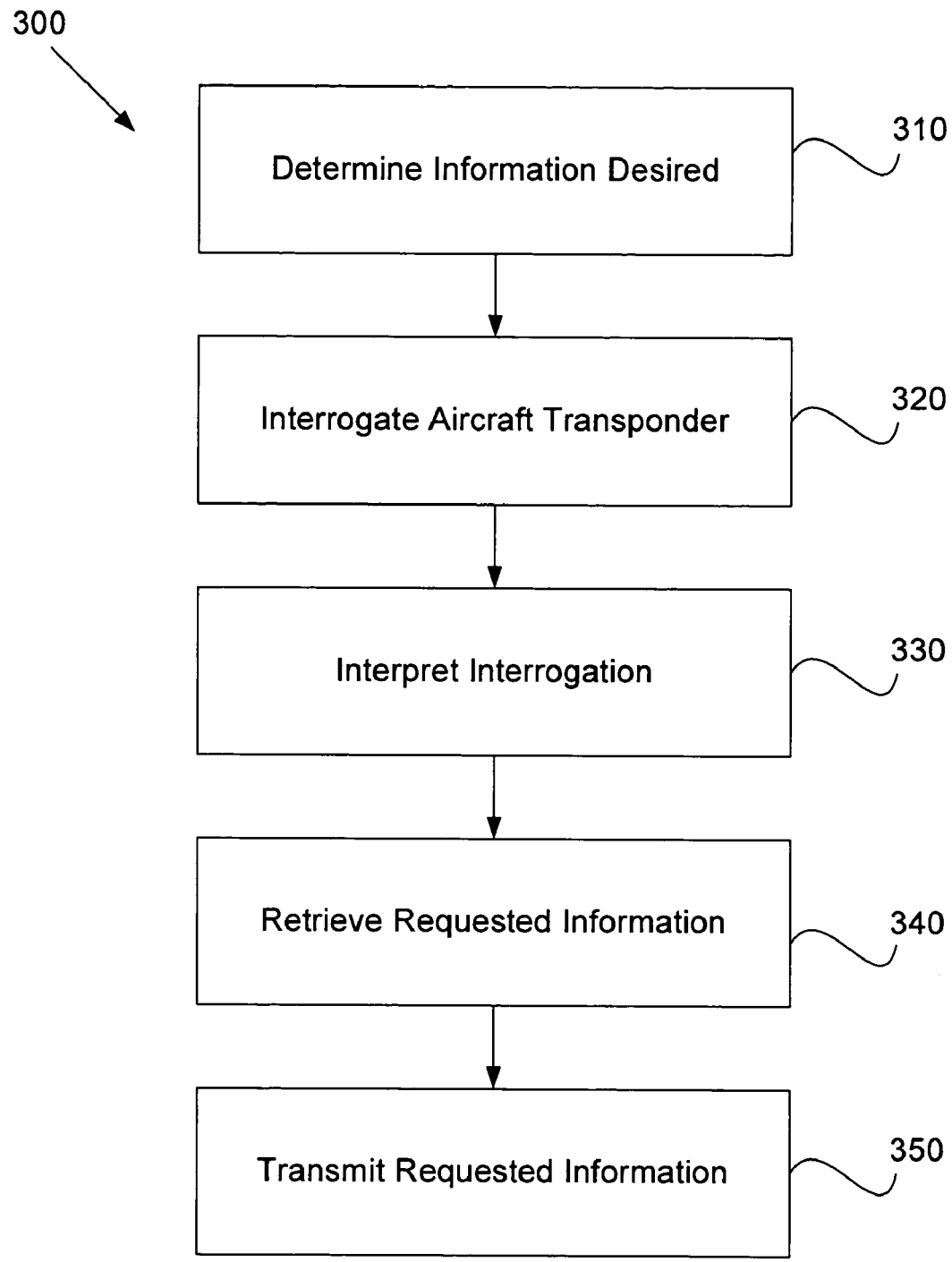
FIG. 3 is an exemplary embodiment of a process which retrieves requested enhanced surveillance data from a second aircraft transponder by a first aircraft.

Referring now to FIG. 3, an exemplary process of the interrogation for enhanced surveillance information is depicted. Process 300 begins with the information determined (step 310). The first aircraft interrogator then interrogates the second aircraft's transponder (step 320). The second aircraft's transponder interprets the interrogation request (step 330). The second aircraft's transponder retrieves the requested information (step 340). The second aircraft's transponder then transmits the requested information via the transponder to the first aircraft (step 350).

As a result of the use of an interrogation to obtain enhanced surveillance information from an intruder aircraft, a further benefit may be obtained. If the information requested is the other aircraft's position based on its on-board navigation system (such as a GPS system or other on-board navigation systems), the result may be verified by comparing it to its own aircraft's position. The difference in position should agree within some tolerance level with the range and bearing measured directly as a result of the interrogation. This check provides a level of integrity to the position information that cannot be achieved by a system where the position of the other aircraft is merely broadcast.

Figure 4:
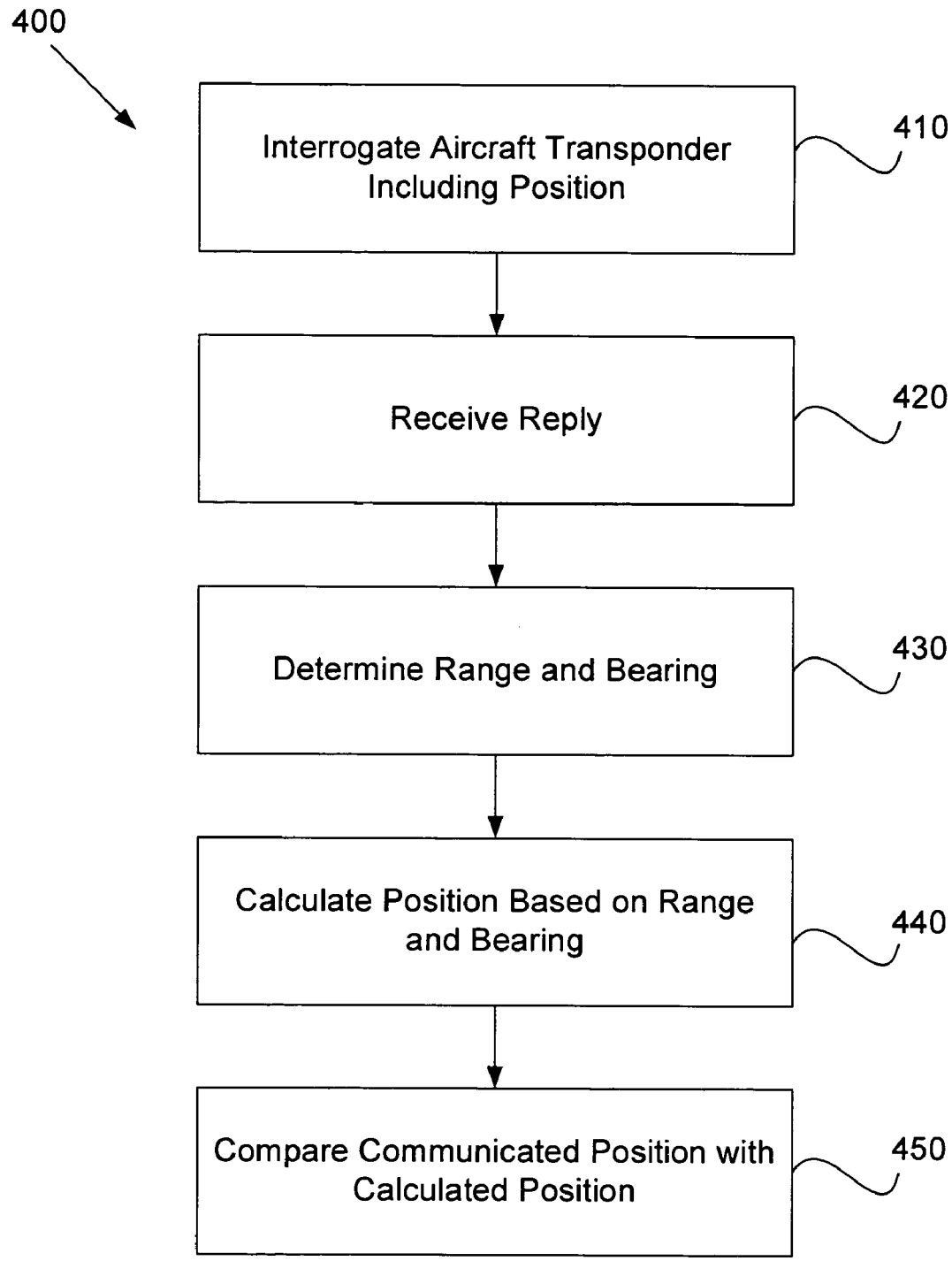
FIG. 4 is an exemplary embodiment of a process in which the integrity of a communicated aircraft's position is checked by a first aircraft using enhanced surveillance data.
Figure 5:
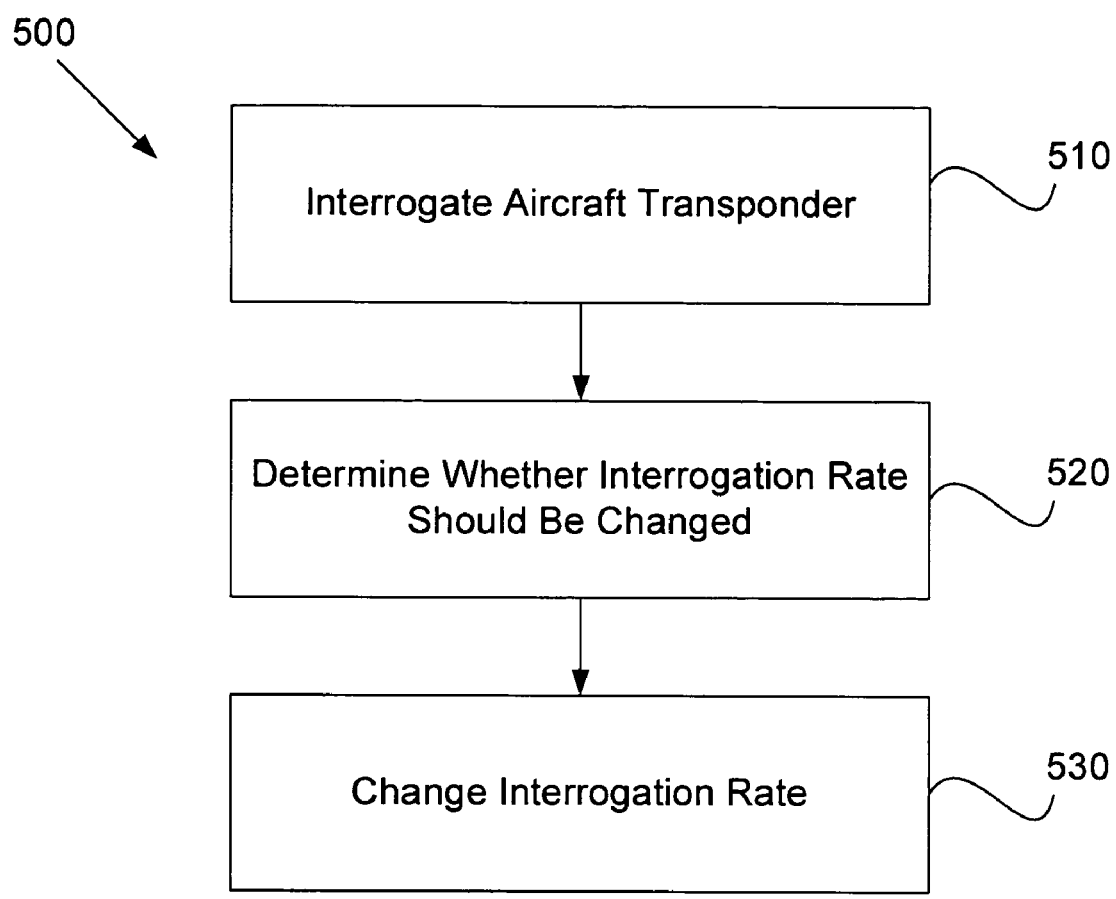
FIG. 5 is an exemplary embodiment of a variable rate interrogation transponder.

An exemplary process in which integrity of another aircraft's position is checked by a first aircraft is depicted by process 400 of FIG. 4. A second aircraft's transponder is interrogated, including a request for position information (step 410). A reply is received from the second aircraft by the first aircraft (step 420). The range and bearing are determined based on the time travel of the reply and request (step 430). Position based on the range and bearing are then calculated (step 440). A comparison is then made of the communicated position with the calculated position (step 450). At that stage then a determination of whether the integrity of the broadcast position has been compromised is made.

Additionally, a system where interrogation is used to obtain enhanced surveillance data from another aircraft provides benefits in that the interrogator may vary its rate of interrogation to satisfy the needs of a dynamic situation. For example, if the data is changing fast and the situation demands attention, the interrogator can increase the rate of interrogation, allowing the data to closely follow the situation of the other aircraft. If the situation is changing slowly and does not demand close attention, the interrogator can reduce its interrogation rate to minimize channel loading. A further benefit of the interrogation system may be that if the data is not received the first time, a retry can occur to insure the information is obtained.

Having the enhanced surveillance data available to an aircraft may allow an aircraft to maintain spacing with another aircraft very precisely in addition to all of the other benefits described above with regards to the communication of enhanced surveillance data.

While the detailed drawings, specific examples, and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing and communication devices. For example, the type of computing and communications devices, communications bus, or processor used may differ. The systems and methods depicted and described are not limited to the precise details and conditions disclosed. Furthermore, other substitutions, modifications, changes, and omissions may be made in the design, operating conditions and arrangement of the exemplary embodiments without departing from the scope of the invention as expressed in the appended claims.

What is claimed is:

1. Traffic alert and collision avoidance system (TCAS), comprising:
    first interrogator positioned onboard a first aircraft, the first interrogator sending an interrogation;
    second transponder positioned onboard a second aircraft, the second transponder responding to the interrogation request, the response comprising enhanced surveillance data that was asked for in the request.

2. The system of claim 1, wherein the first interrogator is a TCAS.

3. The system of claim 1, wherein the second transponder is a Mode S transponder.

4. The system of claim 1, wherein the interrogation request requests aircraft intent information.

5. The system of claim 1, wherein the enhanced surveillance data received allows the first aircraft to maintain a precise spacing with the second aircraft.

6. A method of providing air traffic information from a first aircraft to a second aircraft, comprising:
    receiving an interrogation request from a first aircraft transponder, the request including a request for enhanced surveillance data; and
    responding by a second aircraft transponder a message comprising enhanced surveillance data, that was asked for in the request.

7. The method of claim 6, wherein the enhanced surveillance data comprises aircraft intent.

8. The method of claim 6, further comprising:
    providing an alert to the pilot of the first aircraft based on the received enhanced surveillance information.

9. The method of claim 6, further comprising:
    generating an aircraft maneuver command for the first aircraft based on the received enhanced surveillance information.

10. The method of claim 6, wherein the fist aircraft transponder is a Mode S transponder.

11. The method of claim 6, wherein the second aircraft transponder is a Mode S transponder.

12. A method of integrity checking the position of a second aircraft, comprising:
    interrogating an aircraft transponder onboard the second aircraft including a request for enhanced surveillance data including the position of the second aircraft;
    receiving a reply to the interrogation request by a first aircraft;
    calculating the position of the second aircraft based on the message response time and bearing;
    comparing the calculated position with the received position; and
    determining the integrity of the received position.

13. The method of claim 12, wherein the position of the second aircraft is derived from a global positioning system (GPS) receiver.

14. The method of claim 12, wherein the position of the second aircraft is derived from an on-board navigation system of the second aircraft.

15. The method of claim 12, further comprising:
    providing an alert to a crew member of the first aircraft that the integrity of the received position has been compromised.

16. A method of interrogating a traffic alert and collision avoidance system transponder, comprising:
    interrogating an aircraft transponder including a request for enhanced surveillance data;
    determining based on the enhanced surveillance data received, whether the rate of interrogation should be changed; and
    changing the rate of interrogation if it is determined that the rate should be changed.

17. The method of claim 16, further comprising:
    retrying the interrogation if a reply is not received.

18. The method of claim 16, further comprising:
    retrying the interrogation if a reply is not correct.

19. The method of claim 16, wherein the rate is changed to less than every 30 seconds.

20. The method of claim 16, further comprising:
    providing an alert if the interrogation rate crosses a predetermined threshold.

* * * * *